(12) United States Patent
Bahrami et al.

(10) Patent No.: US 12,342,257 B2
(45) Date of Patent: Jun. 24, 2025

(54) KEY FOB MESH NETWORKING WITH AUTOMOTIVE APPLICATIONS

(71) Applicant: FORD GLOBAL TECHNOLOGIES, LLC, Dearborn, MI (US)

(72) Inventors: Mohsen Bahrami, Birmingham, MI (US); James Wilhelm Heaton, Saline, MI (US); Hamed Asadi, Troy, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 559 days.

(21) Appl. No.: 17/584,061

(22) Filed: Jan. 25, 2022

(65) Prior Publication Data

US 2023/0239765 A1     Jul. 27, 2023

(51) Int. Cl.
*H04W 40/22*     (2009.01)
*H04L 45/00*     (2022.01)
*H04W 40/32*     (2009.01)

(52) U.S. Cl.
CPC ............. *H04W 40/22* (2013.01); *H04L 45/20* (2013.01); *H04W 40/32* (2013.01)

(58) Field of Classification Search
CPC .................................................. H04W 40/22
See application file for complete search history.

(56) References Cited

U.S. PATENT DOCUMENTS

| | | |
|---|---|---|
| 8,035,479 B2 | 10/2011 | Tran |
| 9,317,984 B2 | 4/2016 | Cregg et al. |
| 9,896,063 B2 | 2/2018 | Poma |
| 2010/0010995 A1* | 1/2010 | Fablet ..................... H03M 7/30 |
| | | 707/E17.014 |
| 2014/0342668 A1 | 11/2014 | Kyomitsu |
| 2019/0253508 A1* | 8/2019 | Desai .................... H04L 67/104 |
| 2020/0244466 A1* | 7/2020 | Way ........................ H04L 9/006 |
| 2021/0168106 A1 | 6/2021 | Kuenzi et al. |
| 2023/0239963 A1* | 7/2023 | Jang ........................ H04W 4/02 |
| | | 370/329 |

* cited by examiner

*Primary Examiner* — Jason E Mattis
(74) *Attorney, Agent, or Firm* — Joseph Zane; Brooks Kushman P.C.

(57) ABSTRACT

Mesh device communication is provided. A dictionary of indexes corresponding to different messages is stored to a cache memory of an access device. A message is received via a transceiver of the access device. The cache memory is accessed to look up the message to identify an index corresponding to the message. The message is propagated, via the transceiver, to a wireless access device mesh network including a plurality of other access devices by broadcasting the index of the message.

17 Claims, 10 Drawing Sheets

//KEY FOB MESH NETWORKING WITH AUTOMOTIVE APPLICATIONS

TECHNICAL FIELD

Aspects of the disclosure generally relate to mesh networking for access devices.

BACKGROUND

Vehicle key fobs may be used to allow a user to gain access to a vehicle. Some fob devices operate such that when a button is pressed on the fob, the device sends a code to the vehicle to instruct the vehicle to unlock the vehicle. Passive entry passive start (PEPS) key fobs operate to provide response to a challenge pulse train sent by the vehicle, where if a proper response is received by the vehicle then the door may be unlocked by a user grasping the door handle.

Phone-as-a-key (PaaK) systems are being introduced to allow users to utilize their phones to unlock a vehicle without requiring a key fob device. These systems may operate similar to a key fob, but where the phone communicates with the vehicle over BLUETOOTH LOW ENERGY (BLE) or Ultra-Wide Band (UWB) or other mobile device wireless technologies.

SUMMARY

In a first illustrative example, an access device for mesh device communication is provided. The access device includes a cache memory configured to store a dictionary of indexes corresponding to different messages. The access device further includes a transceiver, The access device also includes a processor programmed to receive a message via the transceiver, look up the message in the cache memory to identify an index corresponding to the message, and propagate the message to other access devices via the transceiver by sending the index of the message in place of the message.

In a second illustrative example, a method for mesh device communication is provided. A dictionary of indexes corresponding to different messages is stored to a cache memory of an access device. A message is received via a transceiver of the access device. The cache memory is accessed to look up the message to identify an index corresponding to the message. The message is propagated, via the transceiver, to a wireless access device mesh network including a plurality of other access devices by broadcasting the index of the message.

In a third illustrative example, a non-transitory computer-readable medium comprising instructions for a mesh device communication that, when executed by a computing device, cause the computing device to perform operations including to store, to a cache memory of an access device, a dictionary of indexes corresponding to different messages; receive a message via a transceiver of the access device; access the cache memory to look up the message to identify an index corresponding to the message; and propagate the message, via the transceiver, to a wireless access device mesh network including a plurality of other access devices by broadcasting the index of the message.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
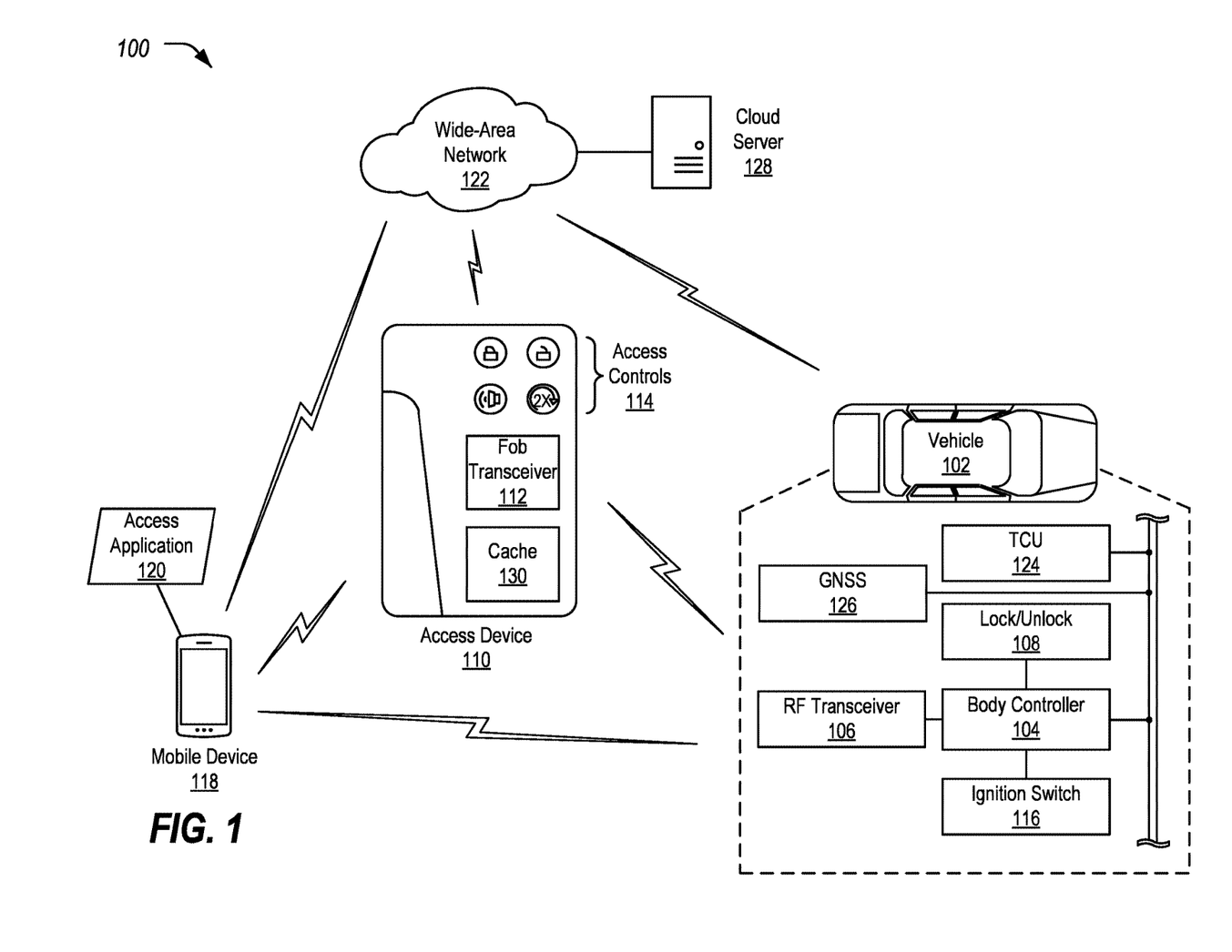
FIG. 1 illustrates an example system implementing key fob mesh networking for automotive applications.

FIG. 1 illustrates an example system 100 implementing access device 110 mesh networking for vehicle 102 applications. The system 100 may include vehicles 102, mobile devices 118, access devices 110, and cloud servers 128. While one of each is shown for simplicity, the system 100 may include various quantities of vehicles 102, mobile devices 118, access devices 110, and cloud server 128.

The vehicle 102 may include a body controller 104 in communication with a radio frequency (RF) transceiver 106. A lock/unlock mechanism 108 may be operably coupled to the body controller 104. The body controller 104 may be configured to control the lock/unlock mechanism 108 to unlock/lock doors of the vehicle 102 in response to wireless signals received by the body controller 104 from the RF transceiver 106. The RF transceiver 106 may operate using various wireless protocols, such as Wi-Fi, UWB, Bluetooth, BLE, and/or near field communication (NFC), as some non-limiting examples.

The access device 110 may be an example of a device configured to be in wireless communication with the vehicle 102. The access device 110 may include an access transceiver 112 configured to communicate access information to the RF transceiver 106. For instance, the access device 110 may include one or more access controls 114, such as lock and unlock buttons. The Accordingly, the access device 110 may send lock, unlock, or other commands to the body controller 104 to control the lock/unlock mechanism 108 to lock or unlock the doors of the vehicle 102. The access device 110 may be implemented in connection with a base remote entry system, a PEPS system or a passive anti-theft system (PATS). With the PEPS system, the body controller 104 may control the lock/unlock mechanism 108 to unlock the door in response to the body controller 104 determining that the access device 110 is a predetermined distance away from the vehicle 102. In such a case, the access device 110 automatically (or passively) transmits encrypted RF signals (e.g., without user intervention) in order for the body controller 104 to decrypt (or decode) the RF signals and to determine whether the access device 110 is within the predetermined distance and is authorized. The access device 110 may also operate using various wireless protocols, such as Wi-Fi, UWB, Bluetooth, BLE, and/or NFC, as some non-limiting examples.

The mobile device 118 may an example of another type of device configured to be in wireless communication with the vehicle 102. The mobile device 118 may include an access application 120 installed to a memory of the mobile device 118. The access application 120 may allow the user to utilize the mobile device 118 as an access device 110 to provide entry to the vehicle 102. In addition, the access application 120 may be able to receive information from the vehicle 102, e.g., transmitted from the vehicle 102 over a wide-area network 122 using a telematics control unit (TCU) 124. In an example, the access application 120 may allow the user to receive from the vehicle 102 information indicative of the position of the vehicle 102, which may be determined by the vehicle 102 using a global navigation satellite system (GNSS) controller 126. The mobile device 118 may also operate using various wireless protocols, such as Wi-Fi, UWB, Bluetooth, BLE, and/or NFC, as some non-limiting examples.

The cloud servers 128 may also be a type of device configured to be in wireless communication with the vehicles 102, access devices 110, and/or mobile devices 118 of the system 100. In many cases, the cloud servers 128 may be in communication with the other devices of the system 100 via the wide-area network 122.

The vehicles 102, access devices 110, mobile devices 118, and cloud servers 128 may secure the wireless communications between one another using cryptographic security. In an example, the vehicles 102, access devices 110, and mobile devices 118 may share a set of one or more public and private key pairs for different purposes (e.g., applications with different authorization levels). In an example, the cloud servers 128 may provide the keys to the other devices of the system 100, such as the vehicles 102, access devices 110, and mobile devices 118.

The access devices 110 may include a cache 130 configured to store and retrieve information received from other devices of the system 100. This cache 130 may be used to store the key information mentioned above. The cache 130 may also be configured to store status information with respect to vehicles 102 as well as diagnostic or other incident information received from the vehicles 102. The cache 130 may also be used as a temporary store of information for intermediate communication between devices. For instance, the cache 130 may maintain information with respect to the messages that have recently been received and/or sent by the access devices 110.

As discussed in further detail with respect to FIGS. 2-10, the vehicles 102, mobile devices 118, and access devices 110 may support one or more short range device-to-device (D2D) applications. For instance, the access device 110 may implement an incident activation option that may be used in incidents where mobile device 118 may not be accessible (e.g., triggering the call over the mobile device 118 and/or vehicle 102, activating the alarm or horn of the vehicle 102, etc.). As another possibility, the access devices 110 may implant functionality to locate missing access devices 110. Single-hop and multi-hop mesh relay communications may also be performed to increase the communications distance of devices in the system 100.

Figure 2:
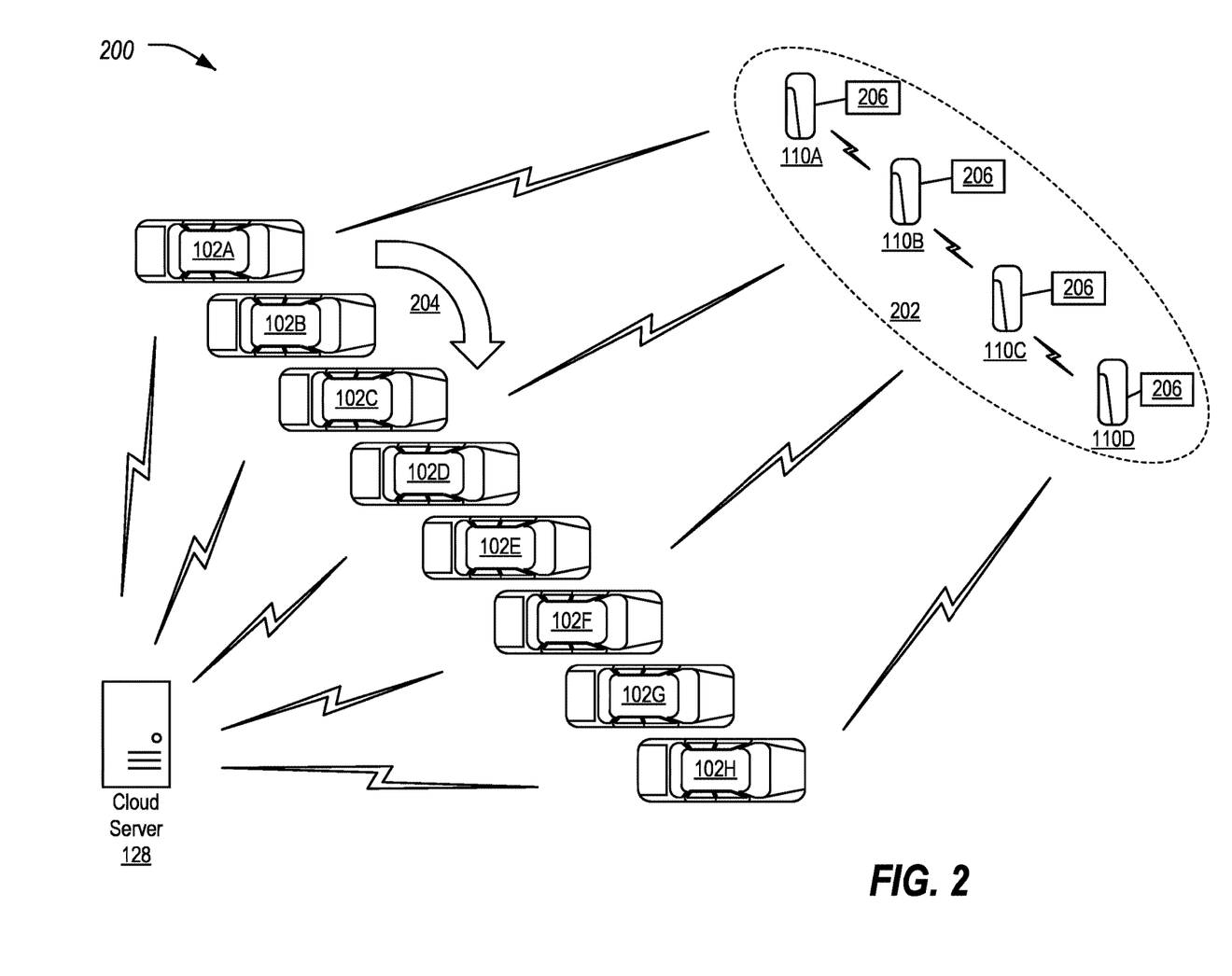
FIG. 2 illustrates an example of a fleet vehicle application of a wireless access device mesh network.

FIG. 2 illustrates an example 200 of a fleet vehicle 102 application of a wireless access device mesh network 202. In the example 200, the cloud server 128 may be in communication with various vehicles 102 of a fleet over the wide-area network 122. Additionally, the vehicles 102 may be in communication with one or more access devices 110. The access devices 110 may be in communication with one another to form the wireless access device mesh network 202. As shown, the example 200 includes eight vehicles 102 and four access devices 110. However, it should be noted that this is for sake of illustration, and fleets of more or fewer vehicles 102 and wireless access device mesh networks 202 of more or fewer access devices 110 may be used.

The wireless access device mesh network 202 may be formed dynamically by the access devices 110. The access devices 110 may be configured to connect to one another directly, as well as to connect to as many other access devices 110 as within the communications range of the access devices 110. The wireless access device mesh network 202 may self-configure based on the current locations of the access devices 110. For instance, each access device 110 may store in the cache 130 information indicative of the different other access devices 110 to which the respective access device 110 can connect. When a message 204 is received to an access device 110, the access device 110 may broadcast the message 204 to the other connected access devices 110 to allow the message 204 to propagate through the wireless access device mesh network 202. The access devices 110 may utilize the cache 130 to record aspects of the recently received messages 204 and ignore the messages 204 that they already received.

Because the access devices 110 may operate as relay nodes in the wireless access device mesh network 202 for the group of fleet vehicles 102, information and alerts may be exchanged among the vehicles 102 through these nodes in the wireless access device mesh network 202. In this terminology, the vehicles 102 may either be source or destination nodes for the communications.

Moreover, as the access devices 110 may be configured via the cache 130, an optimized messaging strategy may be configured for the access devices 110 by sharing a unique dictionary 206 of messages 204 among the access devices 110. For instance, if the access devices 110 have K events and/or messages 204 that may be communicated, then the size of a dictionary 206 to encode that information may utilize $K \times \lceil \log_2 K \rceil$ bits. Instead of sending the actual message 204 in its entirety, just the access device 110 may instead send the index of that message 204 from the dictionary 206 to the wireless access device mesh networks 202 to be received by the other access devices 110 and eventually the recipient vehicles 102. In addition to the index of the message 204 from the dictionary 206, the message 204 may include the source address of the vehicle 102, cloud server 128, or other devices originating the message 204. The message 204 may also include a destination address of the vehicle 102, cloud server 128, or other devices to receive the message 204. An example dictionary 206 is shown in Table 1.

TABLE 1

Example Dictionary 206

| Index | Message |
|---|---|
| 0 | Event #0: object in the roadway |
| 1 | Event #1: fleet vehicle recalled to warehouse |

The fleet vehicles 102 in the proximity range of the wireless communications of the wireless access device mesh network 202 may detect the access devices 110 and utilize the access device 110 to transfer information. The dictionary 206 may be customized for different fleet applications or customers based on the different events and/or messages 204 that may be shared between the vehicles 102.

In some examples, the fleet may specify a set of encryption keys that are to be used for the communication of the messages 204 between the vehicles 102 of the fleet. In one example, these encryption keys may be shared to the vehicles 102 from the cloud server 128. In such an example, the vehicles 102 may be able to communicate freely across the access devices 110, without the possibility of the messages 204 being readable by intermediary access devices 110 of the wireless access device mesh network 202.

Figure 3:
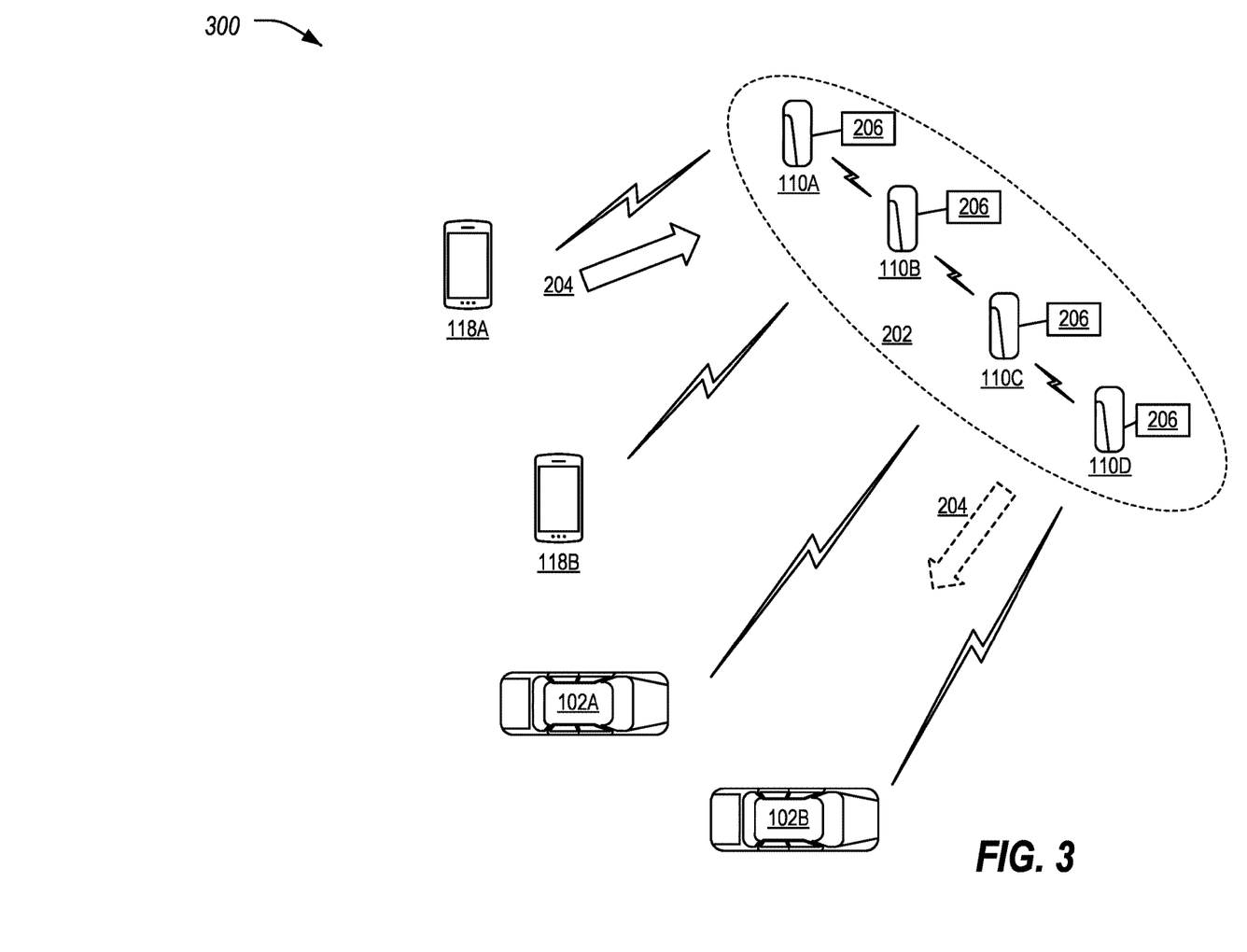
FIG. 3 illustrates an example of using wireless access device mesh networks for platooning applications.

FIG. 3 illustrates an example 300 of using wireless access device mesh networks 202 for platooning applications. As shown in the example 300, two mobile devices 118A and 118B, and two vehicles 102A and 102B are utilizing the message 204 services of the wireless access device mesh network 202 for communication.

For platooning or off-roading with the group of vehicles 102, trip information may be shared between the vehicle 102 and the mobile device 118. This shared information may include, for example, the current locations of the vehicles 102. In the example 300, the access devices 110 may operate as relay nodes and the mobile devices 118 and the vehicles 102 may operate as source or destination nodes. It can be assumed that, as done in the example 200, the dictionary 206 of messages 204 is shared among the access devices 110 and stored in their cache 130 memories. For instance, this dictionary 206 may have been previously provided by the cloud server 128 to the access devices 110 of the wireless access device mesh network 202.

As shown in the example 300, the mobile device 118A may send a message 204 to the vehicle 102B through the wireless access device mesh network 202. Based on the shared dictionary 206, the mobile device 118A sends the index of the message 204 with the address of vehicle 102B as the destination node. The message 204 may be shared among the access device 110 with the goal of reaching the vehicle 102B. If the message 204 includes an announcement, the message 204 may be shown over the human machine interface (HMI) screen of the vehicle 102. Such an approach may be useful for vehicles 102 that include RF transceivers 106 configured to communicate with access device 110 but not with other vehicles 102, as it may be possible for such vehicles 102 to use the wireless access device mesh network 202 to communicate between devices that may not otherwise be able to send and receive messages 204.

Figure 4:
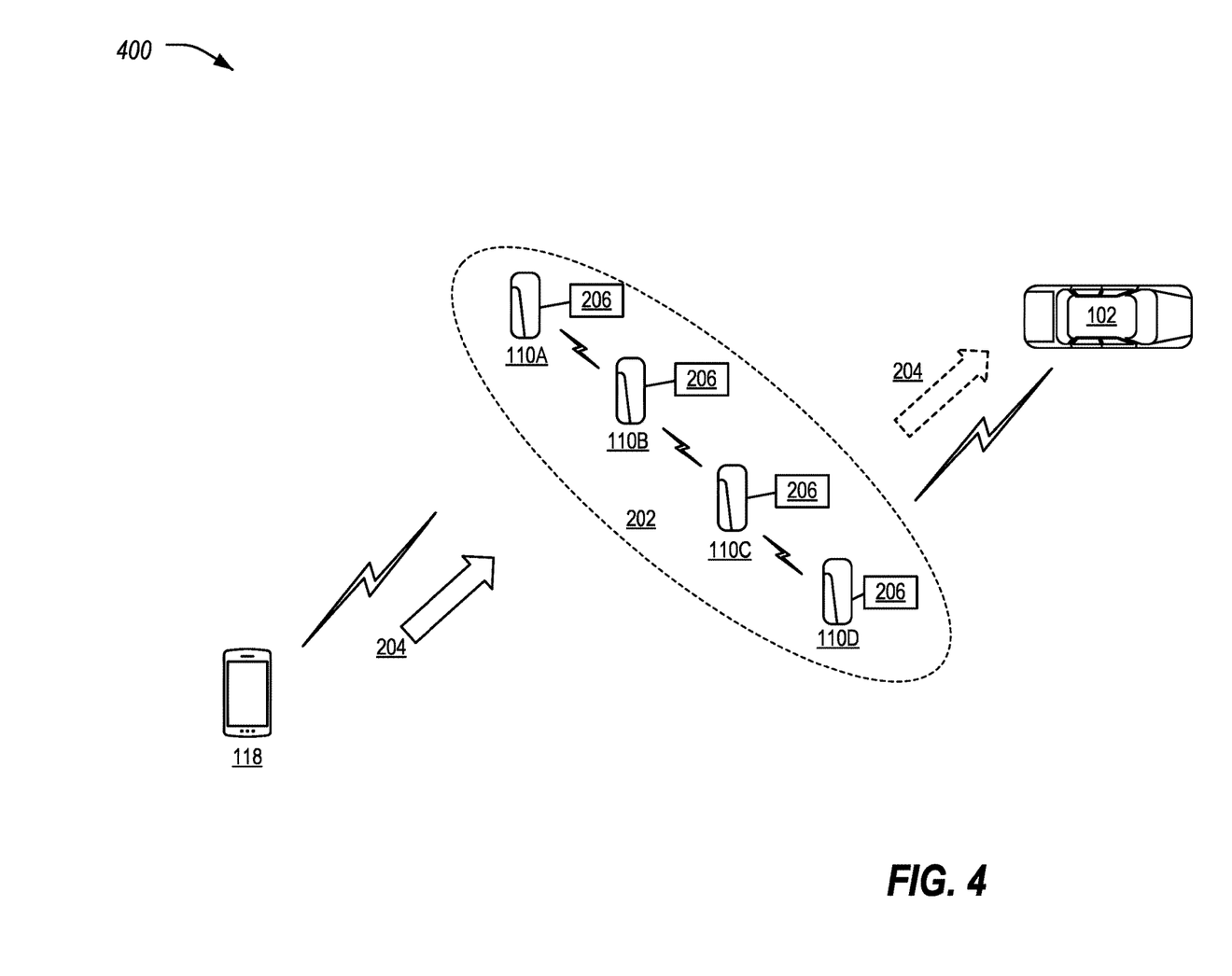
FIG. 4 illustrates an example of an application of the wireless access device mesh network for locating a vehicle in a parking area or other infrastructure.

FIG. 4 illustrates an example 400 of an application of the wireless access device mesh network 202 for locating a vehicle 102 in a parking area or other infrastructure. In the example 400, a user of the mobile device 118 desires to locate the vehicle 102. For instance, a user of the mobile device 118 may activate a find my vehicle 102 application, which in turn sends a message 204 to the wireless access device mesh network 202 with the destination address set to that of the vehicle 102 to be located. This message 204 may traverse the wireless access device mesh network 202. Available access devices 110 in the area, such as key fobs of users of other vehicles, may form the wireless access device mesh network 202 and propagate the message 204 which is received to the vehicle 102. The vehicle 102 may respond, for instance, by activating a horn, light, or other alarm, or by sending a message 204 back to the mobile device 118 indicating the location of the vehicle 102.

Figure 5:
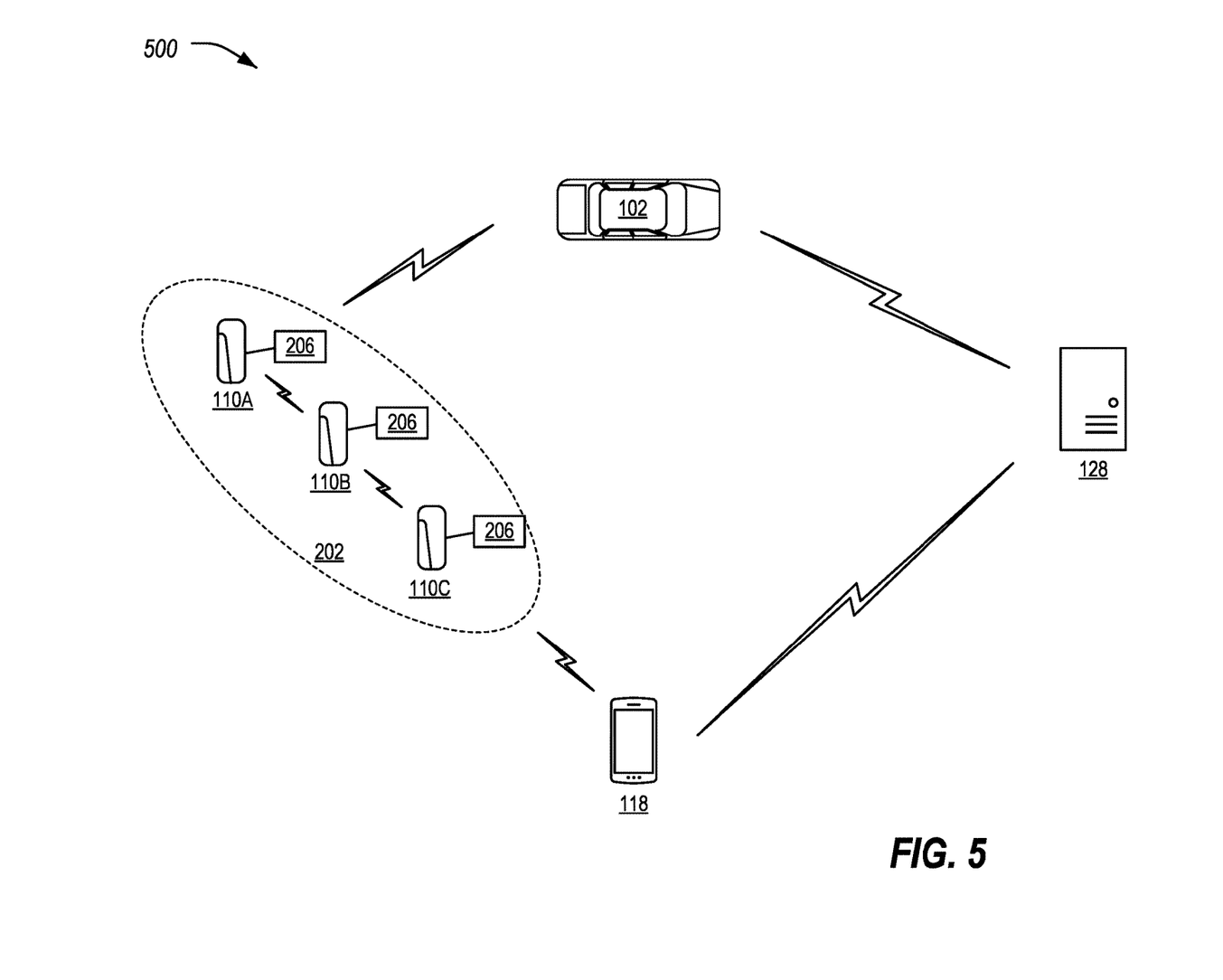
FIG. 5 illustrates an example of an application of the wireless access device mesh network for providing a smart notification.

FIG. 5 illustrates an example 500 of an application of the wireless access device mesh network 202 for providing a smart notification. The access device 110 may be used for notification use cases such as initiating a call responsive to an issue being identified with the vehicle 102, notifying a fleet cloud server 128 about an issue or relaying an indication of the issue to nearby access devices 110. These various applications may be supported using messages 204 through the wireless access device mesh network 202. Since the access device 110 may communicate with both user mobile device 118 and vehicle 102, the trigger for initiating the notification may route through both the user mobile device 118 and also through the wireless access device mesh network 202 notification system. By attempting the communication through these dual routes, a higher reliability on delivery of the notification to the cloud server 128 may be accomplished. This may increase the chance of establishing successful notification of the issue with aid services with fleet backend services.

Figure 6:
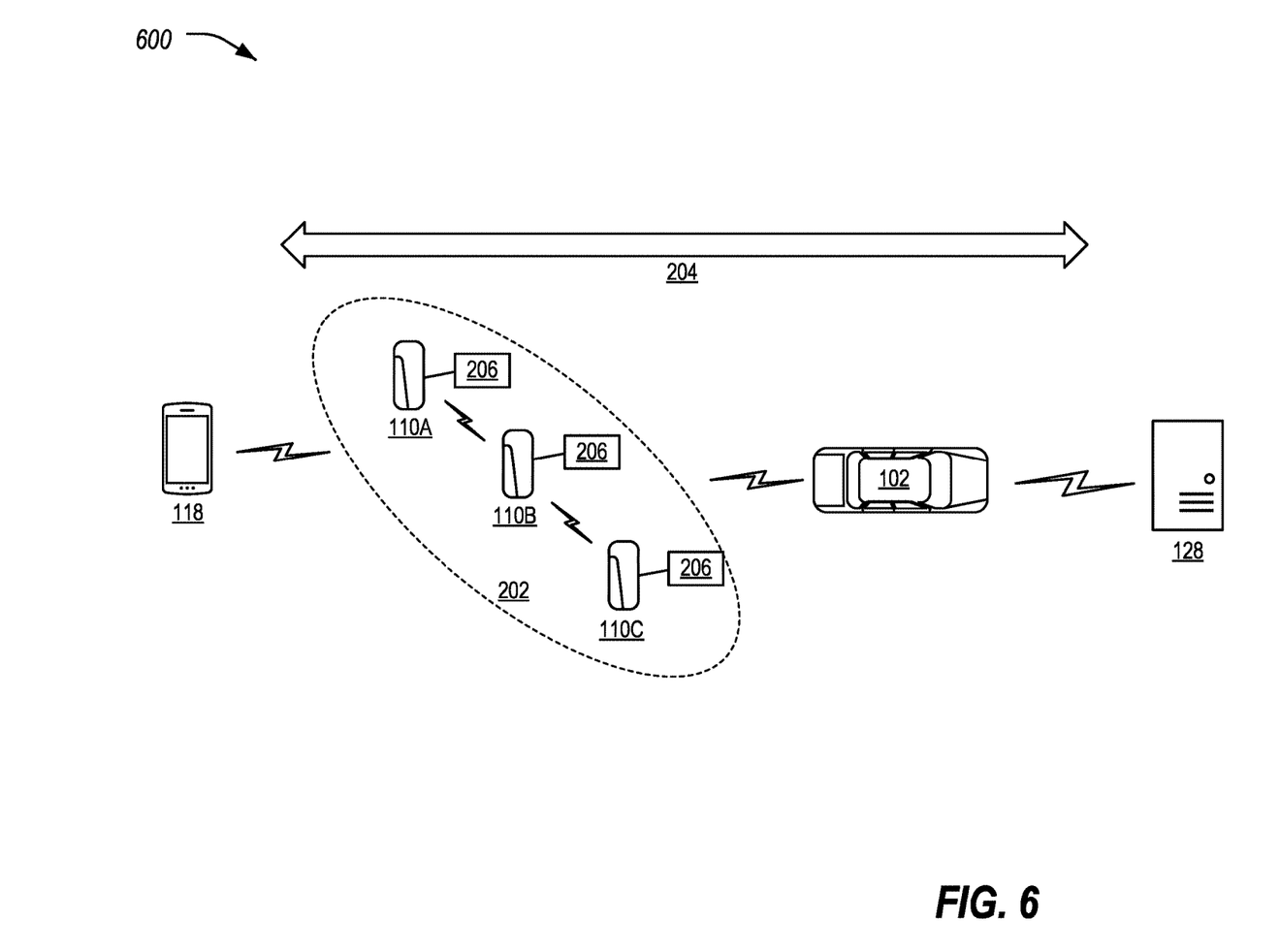
FIG. 6 illustrates an example of an application of the wireless access device mesh network providing fob-as-a-relay functionality.

FIG. 6 illustrates an example 600 of an application of the wireless access device mesh network 202 for providing fob-as-a-relay functionality. The access device 110 may be used for relaying alerts or other information of the vehicles 102 with the mobile device 118 and vice versa. The mobile device 118 may also send messages 204 such as commands to vehicle 102 through the access devices 110. As the access devices 110 are optimized to be used with vehicle 102 this way, the quality of short-range service and/or connected features may be improved. The potential for issues related to radio frequency conditions may also be mitigated due to the use of the wireless access device mesh network 202 to provide multiple messaging paths due to factors such as the ad-hoc nature of the mesh (as well as multiple communications protocols and frequencies being supported by the access devices 110, allowing the access devices 110 to choose protocols and frequencies with the least interference).

Figure 7:
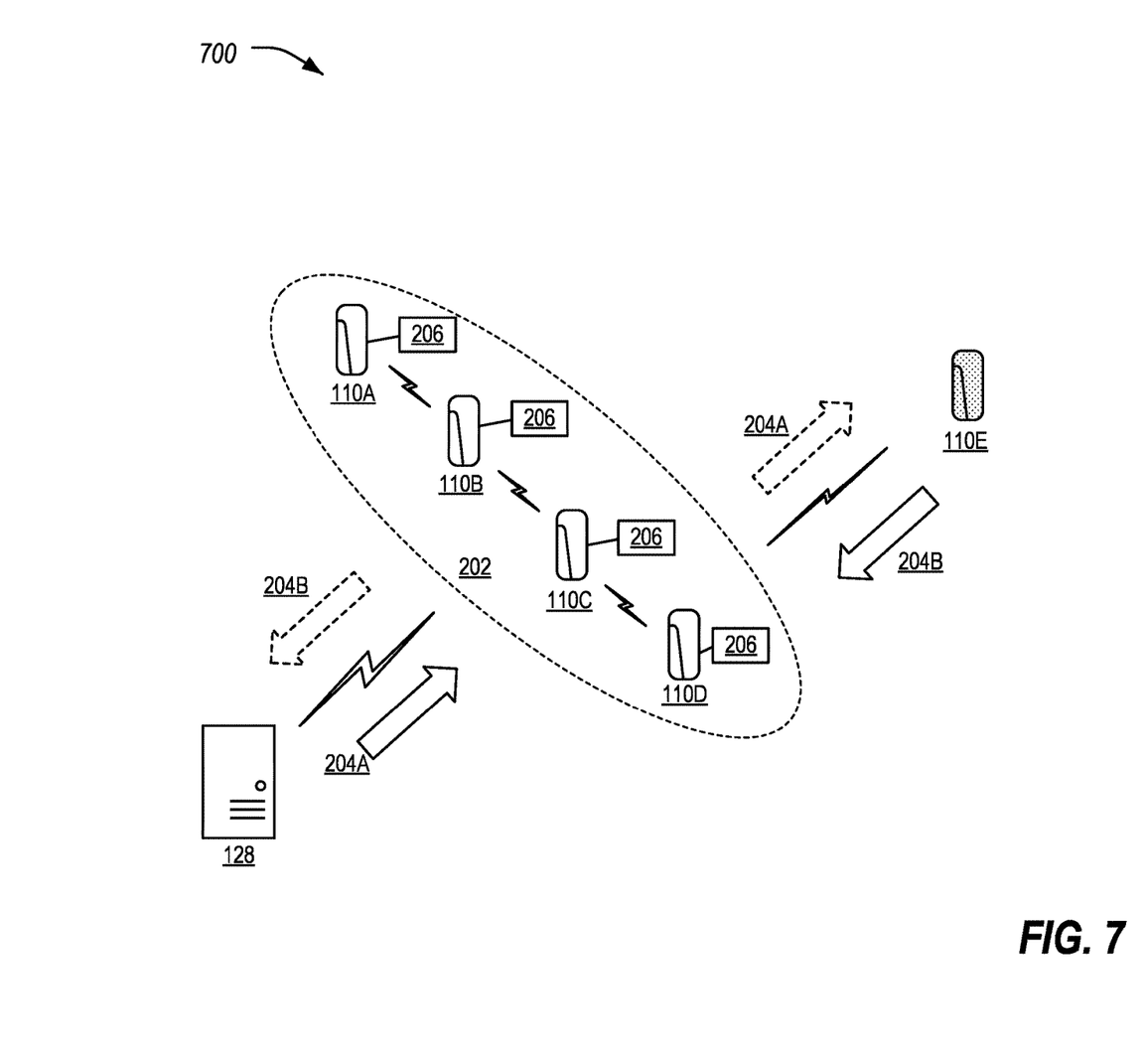
FIG. 7 illustrates an example of an application of the wireless access device mesh network for providing find my fob functionality.

FIG. 7 illustrates an example 700 of an application of the wireless access device mesh network 202 for providing find my fob functionality. In the example 700, the cloud server 128 may operate as a management service to allow for the location of the access devices 110. This may be useful for various situations, such as fleet and rental situations, where it may be common to misplace access devices 110 as the vehicles 102 are being used in a shared manner among employees and customers.

The access devices 110 may be registered with the cloud server 128. Each of the access devices 110 may be assigned a unique identifier. These unique identifiers may then be provided to the cloud server 128. In case of losing the access device 110, a lost device message 204 may be sent by the cloud server 128 through the wireless access device mesh networks 202 with the identity of lost access device 110 (e.g., the identifier of the access device 110). The message 204 may be sent to the access devices 110 which are in communicating with the cloud server 128 and may traverse the wireless access device mesh network 202.

In some examples, the message 204 may be encrypted using keys specific to the customer or fleet or other user of the access device 110 to protect the identity of the access device 110. These keys may be provided to the access devices 110 from the cloud server 128. Responsive to the access device 110 to be located receiving the message 204 via the wireless access device mesh network 202, the access devices 110 of the wireless access device mesh network 202 may inform the cloud server 128 of the geo coordinates of the access device 110 to be located. In the case of commercial fleet, when there may not be wireless connectivity between the access devices 110 and the cloud servers 128, then if cloud server 128 can communicate with one or more vehicles 102, the message 204 may be provided from the one or more vehicles 102 to the wireless access device mesh networks 202 for propagation along the wireless access device mesh network 202 to locate the misplaced access device 110.

In the illustrated example, out of the access devices 110A, 110B, 110C, 110D, and 110E, the access device 110E has been misplaced. To locate the access device 110E, the cloud server 128 sends a message 204A to the wireless access device mesh network 202, where the message 204A propagates along the wireless access device mesh network 202 and reaches the access device 110E. The access device 110E may then reply with a message 204B. The message 204B may indicate the location of the access device 110E. Or, in another example, the access devices 110A-110D of the wireless access device mesh networks 202 may infer the location of the access device 110E from to the locations of which of the access devices 110 of the wireless access device mesh networks 202 are about to communicate with the access devices 110E. These messages 204B including the location may accordingly allow the cloud server 128 to learn the location of the list access devices 110E.

Figure 8:
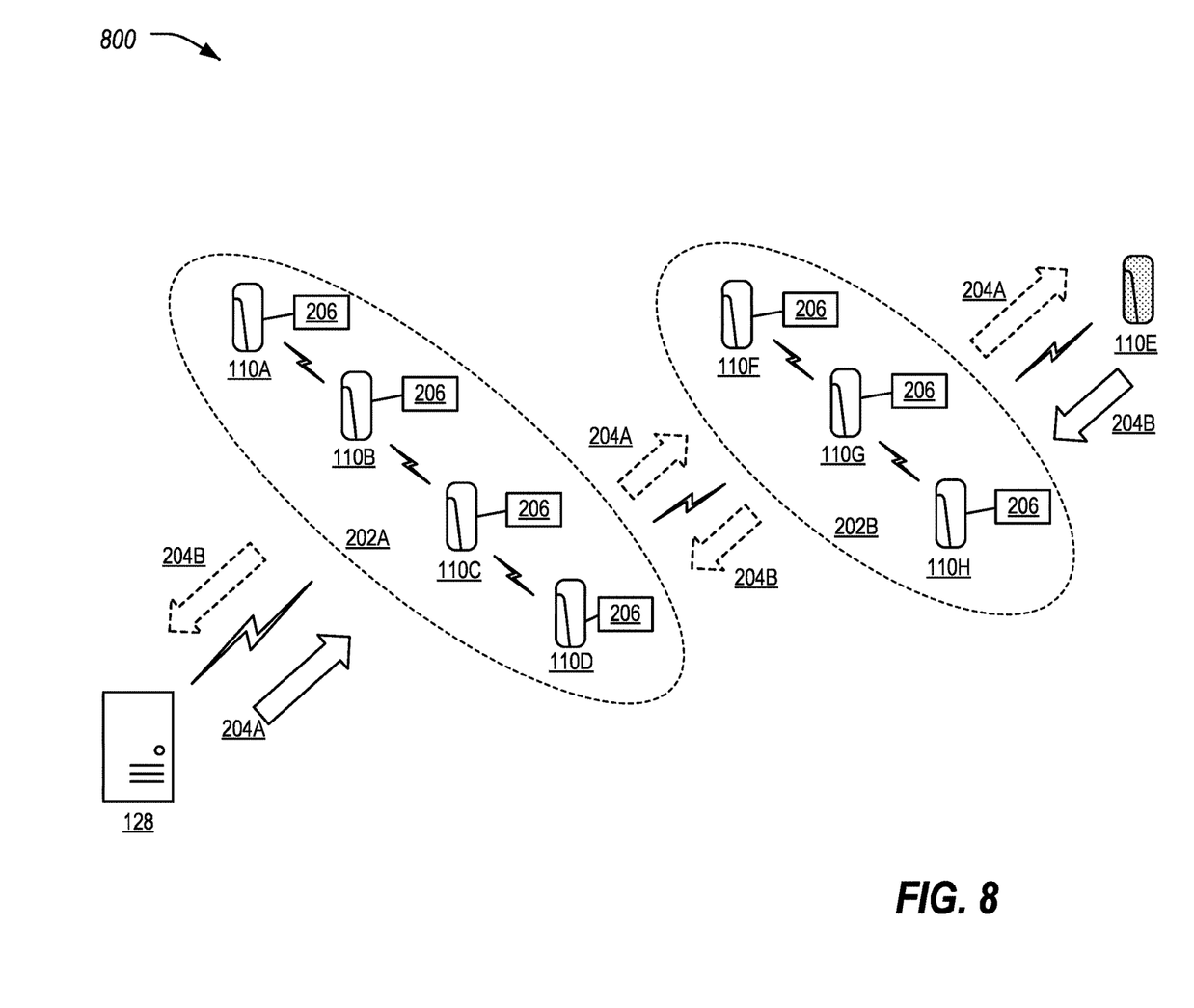
FIG. 8 illustrates an alternative example of the application of the wireless access device mesh network for providing the find my fob functionality.

FIG. 8 illustrates an alternative example 800 of the application of the wireless access device mesh network 202 for providing the find my fob functionality. In the alternative of example 800, the functionality is similar except that a first wireless access device mesh network 202A (e.g., including access devices 110A, 110B, 110C, and 110D) is in communication with a second wireless access device mesh network 202B (e.g., including access devices 110F, 110G, and 110H). Thus, the range of the first wireless access device mesh network 202A may be extended to allow for location or other communication with the access device 110E by communicating with the second wireless access device mesh network 202B. Other variations are possible as well. For instance, as noted for the fob-as-a-relay functionality, various other devices such as vehicles 102, mobile devices 118 and cloud servers 128, may also be used as components of an interconnected network to allow messages 204 to pass to and from one or more wireless access device mesh networks 202.

Figure 9:
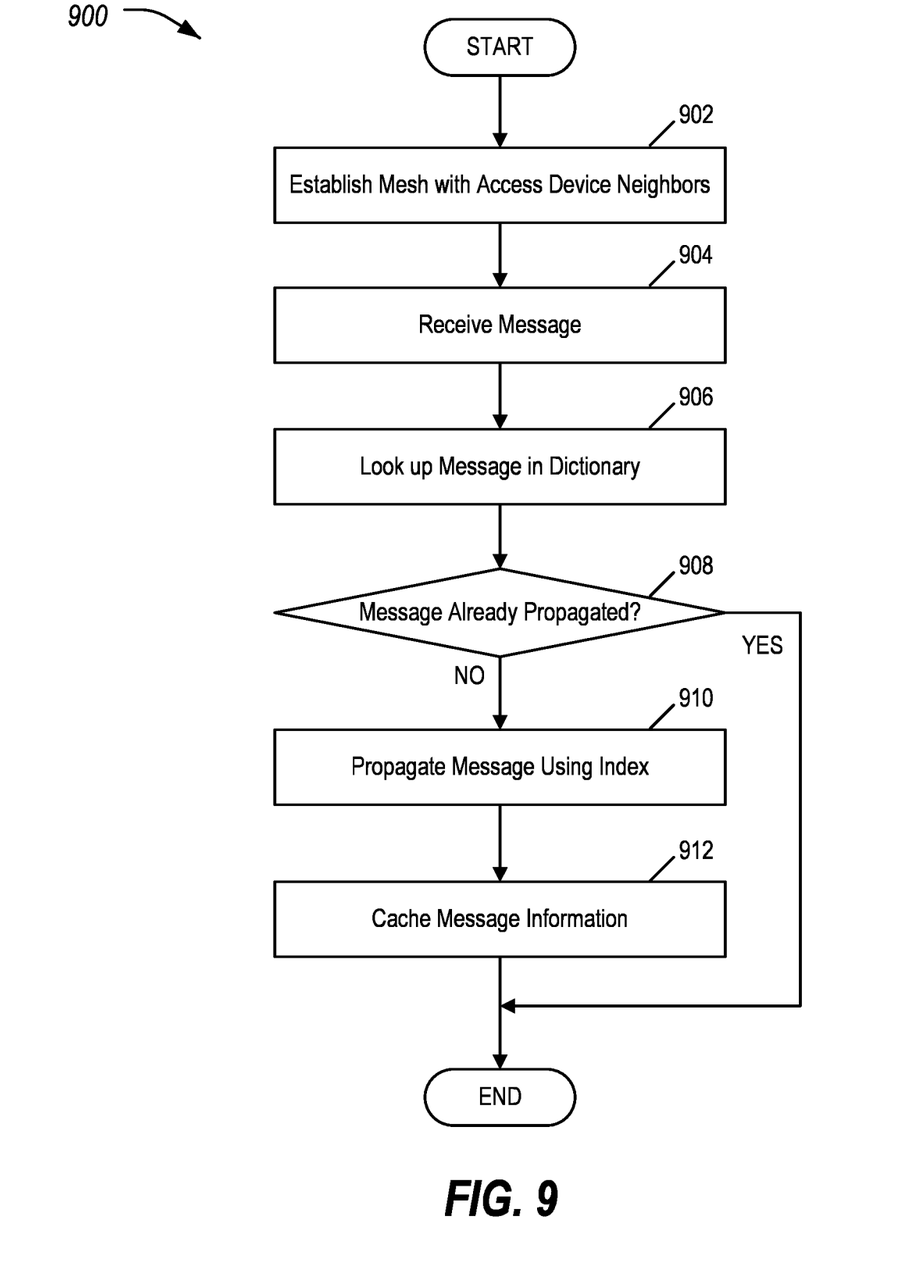
FIG. 9 illustrates an example process for the operation of the wireless access device mesh network.

FIG. 9 illustrates an example process 900 for the operation of the wireless access device mesh network 202. In an example, the process 900 may be performed by one or more of the access devices 110 of the wireless access device mesh network 202 discussed in detail herein.

At operation 902, the access device 110 establishes the wireless access device mesh networks 202 with other access devices 110. In an example, a plurality of access devices 110 may collectively form the wireless access device mesh network 202 by connecting to one another directly, as well as to connect to as many other access devices 110 as within the communications range of the access devices 110. The wireless access device mesh network 202 may self-configure based on the current locations of the access devices 110. For instance, each access device 110 may store in the cache 130 information indicative of the different other access devices 110 to which the respective access device 110 can connect. When a message 204 is received to an access device 110, the access device 110 may broadcast the message 204 to the other connected access devices 110 to allow the message 204 to propagate through the wireless access device mesh network 202

At operation 904, the access device 110 receives a message 204. In an example, the message 204 is received to the transceiver 112 from a vehicle 102, another access device 110, or from a mobile device 118. The message 204 may be received via various wireless protocols, such as Wi-Fi, UWB, Bluetooth, BLE, and/or NFC, as some non-limiting examples.

At operation 906, the access device 110 looks up the message 204 in the dictionary 206. The dictionary 206 may be shared to the cache 130 of each of the access device 110 of the wireless access device mesh network 202. In one example, the dictionary 206 may be provided by the cloud server 128 (e.g., the cloud server 128 managing a fleet of vehicles 102 to which access may be granted via the access devices 110). In an example, the access device 110 may utilize the dictionary 206 to identify an index of the message 204. This may allow the access device 110 to propagate the message 204 by sending the index to the message 204 through the wireless access device mesh network 202 as opposed to sending the entire message 204 itself. If the message 204 is already received using an index, then that index may be used without a further lookup.

At operation 908, the access device 110 determines whether the message 204 has already been propagated by the wireless access device mesh network 202. In an example, the access device 110 may maintain to the cache 130 indexes of the messages 204 recently propagated by the access device 110, as well as the originator and destination devices for the message 204. This may prevent the wireless access device mesh network 202 from continually bouncing the same messages 204. If the message 204 has already been propagated, the process 900 ends. Otherwise, control continues to operation 910

At operation 910, the access device 110 propagates the message 204 using the wireless access device mesh network 202. In an example, the access device 110 utilizes the transceiver 112 to pass along the message 204 using the index identified at operation 906. In some examples, the message 204 may also provide an identifier of the dictionary 206 with the message 204 to ensure that the recipient uses the correct dictionary 206 to decode the message 204.

At operation 912, the access device 110 saves information regarding the message 204 to the cache 130. Thus, the information may be used in future executions of operation 906. After operation 912, the process 900 ends.

Figure 10:
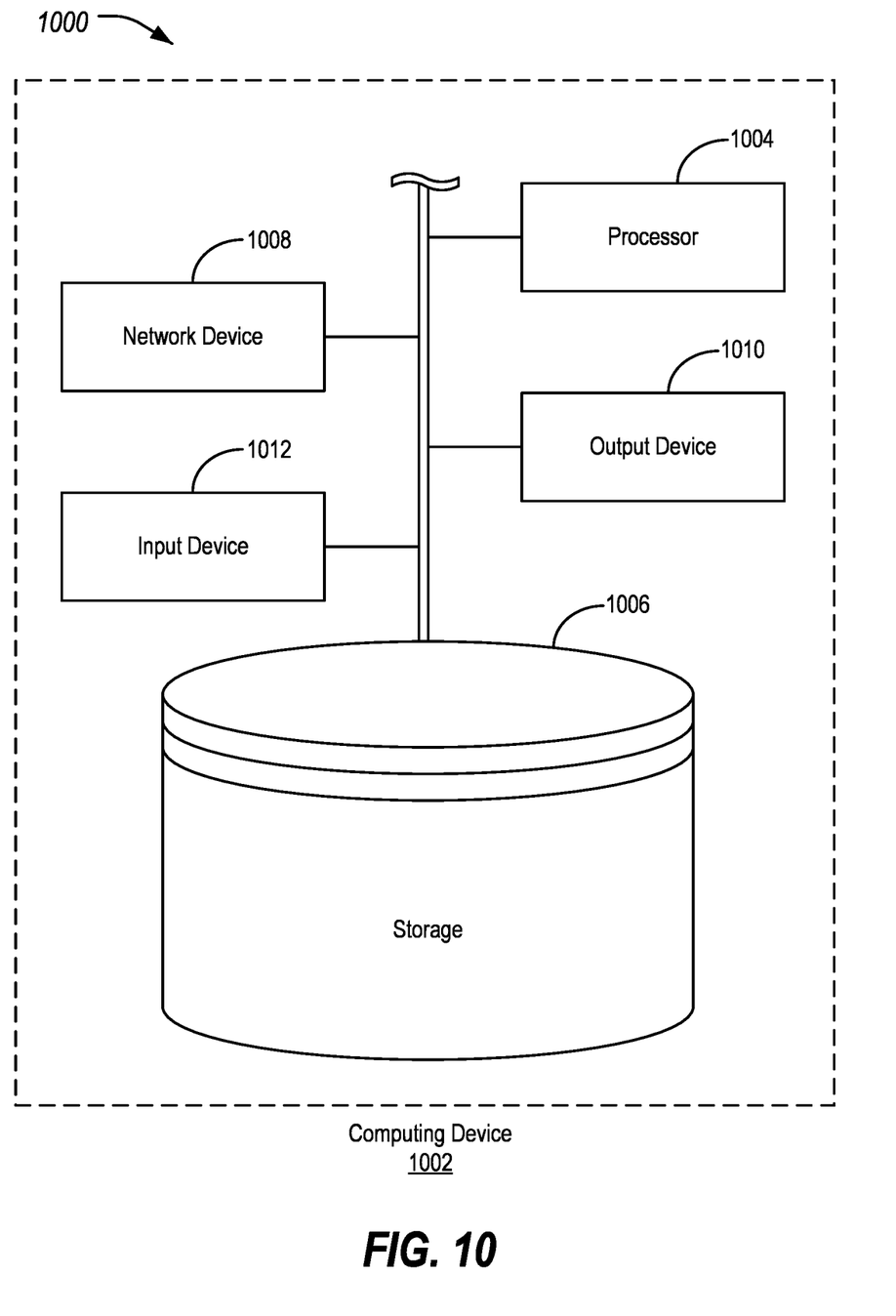
FIG. 10 illustrates an example computing device for mesh device communication.

FIG. 10 illustrates an example 1000 of a computing device 1002 for mesh device communication. Referring to FIG. 10, and with reference to FIGS. 1-9, the hardware performing the operations of the vehicles 102, access devices 110, and cloud servers 128 may include examples of such a computing device 1002. As shown, the computing device 1002 may include a processor 1004 that is operatively connected to a storage 1006, a network device 1008, an output device 1010, and an input device 1012. It should be noted that this is merely an example, and computing devices 1002 with more, fewer, or different components may be used.

The processor 1004 may include one or more integrated circuits that implement the functionality of a central processing unit (CPU) and/or graphics processing unit (GPU). In some examples, the processors 1004 are a system on a chip (SoC) that integrates the functionality of the CPU and GPU. The SoC may optionally include other components such as, for example, the storage 1006 and the network device 1008 into a single integrated device. In other examples, the CPU and GPU are connected to each other via a peripheral connection device such as Peripheral Component Interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 1004 executes stored program instructions that are retrieved from the storage 1006. The stored program instructions, accordingly, include software that controls the operation of the processors 1004 to perform the operations described herein. The storage 1006 may include both non-volatile memory and volatile memory devices. The non-volatile memory includes solid-state memories, such as negative-AND (NAND) flash memory, magnetic and optical storage media, or any other suitable data storage device that retains data when the system 100 is deactivated or loses electrical power. The volatile memory includes static and dynamic random-access memory (RAM) that stores program instructions and data during operation of the system 100.

The GPU may include hardware and software for display of at least 2D and optionally 3D graphics to the output device 1010. The output device 1010 may include a graphical or visual display device, such as an electronic display screen, projector, printer, or any other suitable device that reproduces a graphical display. As another example, the output device 1010 may include an audio device, such as a loudspeaker or headphone. As yet a further example, the output device 1010 may include a tactile device, such as a mechanically raisable device that may, in an example, be configured to display braille or another physical output that may be touched to provide information to a user.

The input device 1012 may include any of various devices that enable the computing device 1002 to receive control input from users. Examples of suitable input devices that receive human interface inputs may include keyboards, mice, trackballs, touchscreens, voice input devices, graphics tablets, and the like.

The network devices 1008 may each include any of various devices that enable computing device 1002 to send and/or receive data from external devices over networks. Examples of suitable network devices 1008 include an Ethernet interface, a Wi-Fi transceiver, a cellular transceiver, or a BLUETOOTH or BLUETOOTH Low Energy (BLE) transceiver, or other network adapter or peripheral interconnection device that receives data from another computer or external data storage device, which can be useful for receiving large sets of data in an efficient manner.

Computing devices 1002 described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, C#, Visual Basic™, JavaScript, Python, Perl, structured query language (SQL), etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure.

Additionally, the features of various implementing embodiments may be combined to form further embodiments of the disclosure.

What is claimed is:

1. An access device for mesh device communication, comprising:
   a cache memory configured to store a dictionary of indexes corresponding to different messages, wherein the dictionary includes K messages that may be communicated, and a bit size of the index of the dictionary is sized to represent each of the K messages as a unique value, wherein the bit size of the index of the dictionary to encode the index is $K \times \lceil \log_2 K \rceil$;
   a transceiver; and
   a processor programmed to
      receive a message via the transceiver,
      look up the message in the cache memory to identify an index corresponding to the message, and
      propagate the message to other access devices via the transceiver by sending the index of the message in place of the message.

2. The access device of claim 1, wherein the dictionary is received to the access device from a cloud server, the cloud server corresponding to a fleet of vehicles for which the access device and the other access devices are configured to provide access, the dictionary being unique to the access devices of the fleet of vehicles.

3. The access device of claim 1, wherein the processor is programmed is operate as a relay node of a wireless access device mesh network including a plurality of access devices, the wireless access device mesh network configured to exchange messages between endpoints, wherein the endpoints are vehicles, mobile devices, or cloud servers.

4. The access device of claim 3, wherein the cache memory is further configured to record the index of the message in the cache memory and ignore the index of the message if subsequently received from another access device to avoid the message repeatedly bouncing through the wireless access device mesh network.

5. The access device of claim 3, wherein the message includes an identifier of a lost access device, and the processor is programmed to reply to the message to indicate the lost access device is seen responsive to the lost access device being in communication with the access device.

6. The access device of claim 3, wherein the cache memory is configured to maintain identifiers of access devices recently seen by the access device, the message includes an identifier of a lost access device, and the processor is programmed to reply to the message to indicate the lost access device is identified in the cache memory.

7. A method for mesh device communication, comprising:
   storing, to a cache memory of an access device, a dictionary of indexes corresponding to different messages, wherein the dictionary includes K messages that may be communicated, and a bit size of the index of the dictionary is sized to represent each of the K messages as a unique value, wherein the bit size of the index of the dictionary to encode the index is $K \times \lceil \log_2 K \rceil$;
   receiving a message via a transceiver of the access device;
   accessing the cache memory to look up the message to identify an index corresponding to the message; and
   propagating the message, via the transceiver, to a wireless access device mesh network including a plurality of other access devices by broadcasting the index of the message.

8. The method of claim 7, wherein the dictionary is received to the access device from a cloud server, the cloud server corresponding to a fleet of vehicles for which the access device and the other access devices are configured to provide access, the dictionary being unique to the access devices of the fleet of vehicles.

9. The method of claim 7, further comprising the access device operating as a relay node of the wireless access device mesh network, the wireless access device mesh network configured to exchange messages between endpoints, wherein the endpoints are vehicles, mobile devices, or cloud servers.

10. The method of claim 7, further comprising:
    recording the index of the message in the cache memory; and
    ignoring the index of the message if the index is subsequently received from another of the access devices, thereby avoiding the message repeatedly bouncing through the wireless access device mesh network.

11. The method of claim 7, wherein the message includes an identifier of a lost device, and further comprising replying to the message to indicate the lost device is seen responsive to the lost device being in communication with the access device.

12. The method of claim 7, wherein the cache memory is configured to maintain identifiers of access devices recently seen by the access device, the message includes an identifier of a lost device, and further comprising replying to the message to indicate the lost device is identified in the cache memory.

13. A non-transitory computer-readable medium comprising instructions for a mesh device communication that, when executed by a computing device, cause the computing device to perform operations including to:
    store, to a cache memory of an access device, a dictionary of indexes corresponding to different messages, wherein the dictionary includes K messages that may be communicated, and a bit size of the index of the dictionary is sized to represent each of the K messages as a unique value, wherein the bit size of the index of the dictionary to encode the index is $K \times \lceil \log_2 K \rceil$;
    operate as a relay node of the wireless access device mesh network, the wireless access device mesh network configured to exchange messages between endpoints, wherein the endpoints are vehicles, mobile devices, or cloud servers;
    receive a message via a transceiver of the access device;
    access the cache memory to look up the message to identify an index corresponding to the message; and
    propagate the message, via the transceiver, to a wireless access device mesh network including a plurality of other access devices by broadcasting the index of the message.

14. The medium of claim 13, wherein the dictionary is received to the access device from a cloud server, the cloud server corresponding to a fleet of vehicles for which the access device and the other access devices are configured to provide access, the dictionary being unique to the access devices of the fleet of vehicles.

15. The medium of claim 13, further comprising instructions that when executed by the computing device cause the computing device to perform operations including to:
    record the index of the message in the cache memory; and
    ignore the index of the message if the index is subsequently received from another of the access devices, thereby avoiding the message repeatedly bouncing through the wireless access device mesh network.

16. The medium of claim 13, wherein the message includes an identifier of a lost device, and further comprising instructions that when executed by the computing device cause the computing device to perform operations including to reply to the message to indicate the lost device is seen responsive to the lost device being in communication with the access device.

17. The medium of claim 13, wherein the cache memory is configured to maintain identifiers of access devices recently seen by the access device, the message includes an identifier of a lost device, and further comprising instructions that when executed by the computing device cause the computing device to perform operations including to reply to the message to indicate the lost device is identified in the cache memory.

\* \* \* \* \*